May 25, 1965  J. F. HAMAN  3,185,125
MANUALLY POWERED AQUATIC DEVICE
Filed Sept. 10, 1962
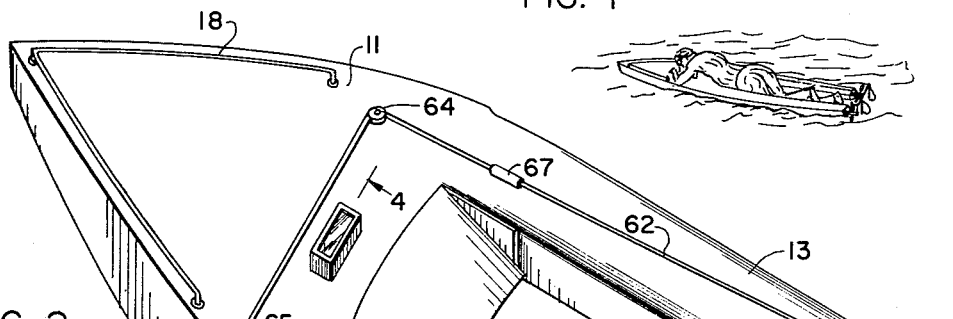
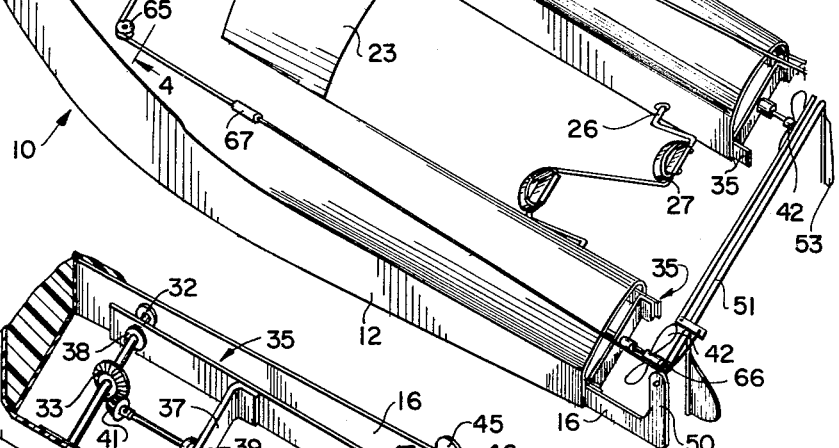
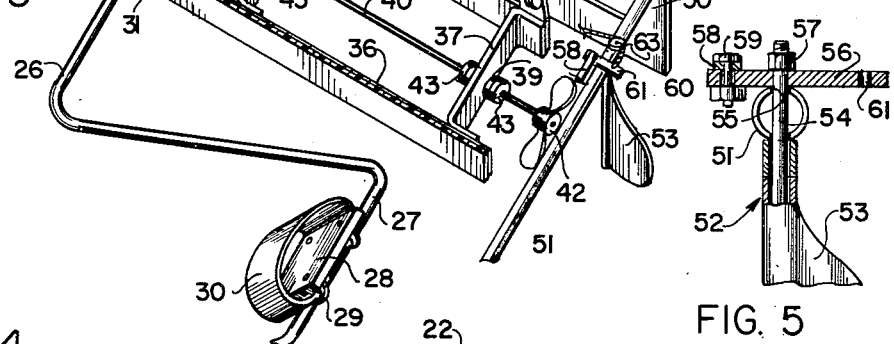
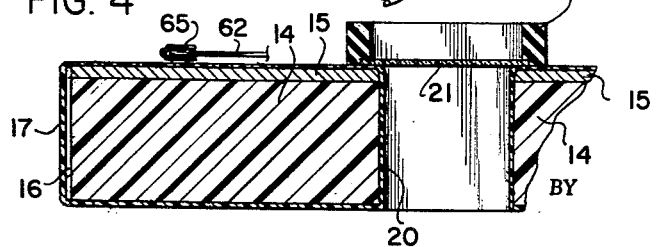
INVENTOR
JOHN F. HAMAN
BY
ATTORNEY United States Patent Office 3,185,125
Patented May 25, 1965

3,185,125
MANUALLY POWERED AQUATIC DEVICE
John F. Haman, Box 413, Rte. 2, Deland, Fla.
Filed Sept. 10, 1962, Ser. No. 222,463
13 Claims. (Cl. 115—26.3)

This invention relates to aquatic devices as well as devices utilized in water sports and salvage work in relatively shallow water, and to means for propelling and controlling the direction of travel of such devices through the water.

The invention relates particularly to an aquatic vehicle of the catamaran type which is manually propelled by the pedal extremities by an operator and the direction of travel is controlled by movement of the operator's arms.

Heretofore various aquatic devices have been manufactured which have been manually propelled and controlled, but such devices have been bulky, unwieldly, expensive to manufacture, difficult to control and have lacked a safety feature which would permit the device to be used by handicapped people.

It is an object of the invention to provide an aquatic vehicle of the catamaran type which may be used by handicapped persons for therapeutic treatment by providing means for manually propelling such vehicle by the pedal extremities of the operator.

Another object of the invention is to provide an aquatic vehicle having a transparent viewing port which may be used to observe marine life, as well as for salvage work to locate objects below the surface of the water.

Another object of the invention is to provide an aquatic vehicle which may be manually propelled by the feet of the operator and the direction of such vehicle can be controlled by one or both hands from a remote position.

A further object of the invention is to provide an aquatic vehicle which is unsinkable, virtually impossible to accidentally overturn and which includes safety features to prevent accidental damage to the operator.

A still further object is to provide a lightweight, portable; easily manufactured aquatic device which may be removed from the water and placed in upright position without damage to the operating mechanisms.

Other objects and advantages of the invention will be apparent from the following description taken in conjunction with the accompanying drawing in which:

FIG. 1 is a perspective illustrating one application of the invention;

FIG. 2, an enlarged perspective of the aquatic vehicle of FIG. 1;

FIG. 3, an enlarged fragmentary detail perspective ilustrating the propulsion and control mechanisms of the vehicle of FIG. 2;

FIG. 4, an enlarged fragmentary section on the line 4—4 of FIG. 2; and

FIG. 5, an enlarged fragmentary detail section on the line 5—5 of FIG. 3.

Briefly stated, the invention comprises an aquatic vehicle of the catamaran type having an upper surface of waterproof plywood or the like and covered by a waterproof material such as fiberglass. The vehicle is adapted to be propelled by a crank having a pair of pedals with means for attaching the pedals to the feet of the operator, and such crank rotates a bevel gear adjacent each end thereof. Each bevel gear is adapted to drive a pinion gear mounted on one end of a shaft, on the opposite end of which is mounted a propeller for driving the vehicle through the water. Each propeller shaft is carried by a frame pivotally mounted at one end to the crank shaft and adjustably mounted at the opposite end to the frame work of the vehicle. The sides of the device extend rearwardly beyond the propellers and are connected by a bar which pivotally supports a rudder behind each of the propellers, and such rudders are connected to a control line extending forwardly to the front of the vehicle so that the operator can control the direction of travel of the vehicle. The forward portion of the vehicle is provided with a viewing port having a transparent partition so that the operator may observe objects below the surface of the water.

With continued reference to the drawing, the aquatic vehicle of the present invention comprises a bifurcated body 10 having a forward portion 11 connecting a pair of rearwardly extending substantially parallel side members 12 and 13 to form a catamaran type aquatic vehicle. The body of the vehicle is constructed of expanded material such as styrofoam 14 or other buoyant material with an upper layer or deck of relatively stiff material such as waterproof plywood 15. A generally U-shaped member 16 extends around and forms the outside of the body and projects a substantial distance rearwardly thereof. The expanded material, plywood deck and side members are enclosed within a fiberglass covering 17 to form a strong waterproof and unsinkable aquatic vehicle. The rearwardly extending side members 12 and 13 are spaced apart a distance sufficient to accommodate an operator and the vehicle is of a size to support the full weight of the operator under any condition. If desired a hand rail 18 may be located about the periphery of the forward portion 11.

The forward portion 11 is provided with an axial opening or port 20 covered by a transparent viewing plate 21 at the level of the plywood deck so that the operator of the vehicle can look downwardly through the body to observe objects below the surface of the water. In order to exclude light to prevent a reflective glare on the transparent plate, an upwardly extending sleeve 22 of foam rubber or other deformable material is provided around such transparent plate 21 and port 20. When the operator desires to observe articles beneath the vehicle, he merely presses his face into the deformable sleeve and peers through the transparent plate. The body 11 is provided with a downwardly tapered portion 23 intermediate the rearwardly extending side members 12 and 13 to support an operator in such a manner that the operator does not rest upon a sharp corner or surface.

The vehicle is adapted to be propelled by a crankshaft 26 having offset cranks 27 upon which pedals 28 are pivotally mounted by U-bolts 29. Each of the pedals 28 has a strap 30 which provides a stirrup or foot-receiving member to maintain the feet of the operator in contact with the pedals 28. The crankshaft 26 extends through the rearwardly extending side members 12 and 13 and is rotatably carried by bearings 31 and 32 in the inner and outer sides of the side portions respectively. The rear portion of each of the side members 12 and 13 is hollow and adapted to receive a bevel gear 33 fixed adjacent each end of the crankshaft 26.

Within the hollow portion of each side, a frame 35 comprising longitudinal side members 36 connected by transverse braces 37 is pivotally mounted at one end to the crankshaft 26. The crankshaft is received within bearings 38 in the forward end of the longitudinal members 36. The braces 37 are provided with fixed bearings 39 in which are received a propeller shaft 40 having a pinion gear 41 mounted on one end and such pinion gear meshes with the bevel gear 33 to drive the propeller shaft 40.

On the opposite end of each of the propeller shafts is mounted a propeller 42 with the propellers on opposite sides of the vehicle being counter-rotating to prevent torque when the vehicle is moving through the water. The propeller shaft 40 is provided with adjustable sleeves 43 located adjacent to the bearings 39 to maintain such shaft in longitudinal position with the pinion gear 41 meshing with the bevel gear 33.

Each of the frames 35 is provided at its rear end with an upstanding arcuate adjusting member 45 having a slot 46 in which is received a bolt 47 fastened by a wing nut 48. The bolt 47 is connected to the side member 16 and the frame 35 may be pivoted about the crankshaft 26 and secured in fixed position by the wing nut 48.

The side forming U-shaped member 16 is provided at each of its rear extremities with an upwardly projecting lug or extension 50 connected by a tie rod 51. Such tie rod is adapted to support a rudder assembly 52 behind each of the propellers 42 to control the direction of movement of the vehicle. The rudder assembly includes a rudder 53 fixed to a pintle 54 which passes through openings 55 in the tie rod 51 and is removably fastened to a rudder bar 56 by a nut 57 thereabove.

In order to operate both rudders simultaneously, the forward portion of the rudder bars 56 are joined by a connecting bar 58 pivotally secured to such rudder bars by a fastener 59 received within an opening 60 in the rudder bar. Each of the rudder bars is provided with an opening 61 in its rear portion in which is received one end of a control cable or line 62. The cable 62 is fastened to one of the rudder bars 56 by a knot or other fastening means and extends around a pulley 63 mounted on the tie rod 51 in spaced relation to the rudder bar 56 and then forwardly about a pulley 64 mounted on the body 11, across the body and around a pulley 65, then rearwardly about a pulley 66 and is fastened to the other rudder bar in a manner similar to the opposite end of such cable. The cable 62 is provided with a pair of hand grips 67 on opposite sides of the vehicle so that the operator can control the direction of travel of the vehicle by moving either hand grip forwardly or rearwardly.

When it is desired to remove the vehicle from the water and to store the same, the vehicle may be lifted and placed in an upright position and supported by the side members 16 and upwardly projecting lugs 50.

In the operation of the device, the vehicle is placed in the water and an operator assumes a prone position between the rearwardly extending side members 12 and 13 with the upper portion of his body resting upon the tapered portion 23. In order to propel the vehicle, the operator places his feet within the stirrups 30 and by turning the crank 26 with his legs, he drives the propellers to move the boat either forwardly or rearwardly depending upon the direction of rotation of the crankshaft. When the vehicle is in motion, the operator can control the direction of movement by operating the control cable to adjust the twin rudders.

It will be obvious to one skilled in the art that various changes may be made in the invention without departing from the spirit and scope thereof and therefore the invention is not limited by that which is illustrated in the drawing and described in the specification, but only as indicated in the accompanying claims.

What is claimed is:
1. An aquatic vehicle comprising
(A) a body having
  (1) a forward portion,
  (2) rearwardly extending spaced parallel portions,
  (3) a U-shaped side forming member extending rearwardly of said spaced parallel portions,
(B) propelling means for said body including
  (1) a crankshaft connecting the spaced parallel portions of said body,
  (2) a pair of foot engaging pedals on said crankshaft having
    (a) means for retaining the feet of an operator on said pedals,
  (3) a pair of bevel gears mounted one adjacent each end of said crankshaft,
  (4) a frame pivotally mounted on each end of said crankshaft and straddling said bevel gears,
  (5) a propeller shaft rotatably mounted in bearings carried by said frames,
  (6) a pinion gear on one end of said propeller shaft and meshing with said bevel gear to drive said propeller shaft,
  (7) a propeller on the opposite end of said propeller shaft,
  (8) means for adjusting the angularity of said frames,
(C) direction controlling means for said body including
  (1) a pair of rudders,
  (2) a rudder bar for each rudder,
  (3) a control cable connecting one rudder bar with the opposite rudder bar.
2. An aquatic vehicle comprising
(A) a body of the catamaran type having
  (1) rearwardly extending spaced parallel side portions,
  (2) a forward portion connecting said side portions,
(B) propelling means for said body including
  (1) a crankshaft connecting said parallel side portions of said body,
  (2) pedal means on said crankshaft,
  (3) a bevel gear mounted adjacent each end of said crankshaft,
  (4) a pair of frames pivotally mounted on said crankshaft adjacent the ends thereof,
  (5) a propeller shaft rotatably carried by each of said frames,
  (6) a pinion gear on one end of each of said propeller shafts and being in engagement with said bevel gears to drive said propeller shaft,
  (7) a propeller on the opposite end of said propeller shaft,
  (8) means for adjusting the angularity of said frames, and
  (9) means for fixing said frames in adjusted position,
(C) direction controlling means for said body including
  (1) a pair of rudders in operative association with said propellers,
  (2) a rudder bar for each rudder,
  (3) a control cable connecting one rudder bar with the opposite rudder bar,
  (4) a connecting bar attached to said rudder bars, and
  (5) means on said control cable for moving said cable to adjust the angularity of said rudders
whereby the vehicle may be manually propelled through a body of water and the direction of movement can be controlled by said cable.

3. The structure of claim 2 in which the propellers are counter-rotating.

4. The structure of claim 2 in which the body has an opening covered by a transparent viewing plate whereby the operator of the vehicle can observe objects below the surface of the water.

5. An aquatic vehicle for therapeutic use comprising
(A) a body of the catamaran type having
  (1) rearwardly extending parallel side portions,
  (2) a forward bow portion connecting said side portions,
  (3) said forward portion having a tapered portion intermediate said rearwardly extending side portions for supporting the upper portion of the body of an occupant between said side portions,
(B) propelling means for said body including
  (1) a crankshaft connecting the spaced parallel side portions, (2) a pair of foot-engaging pedals on said crankshaft,
(3) means for retaining the feet of an operator on said pedals,
(4) a propeller shaft rotatably mounted in the rear portion of each side portion,
(5) a propeller mounted on the rear end of each propeller shaft, and
(6) drive means connecting said crankshaft and said propeller shaft,
(C) direction controlling means for said body including
(1) rudder means,
(2) cable means conected to said rudder means whereby a handicapped operator can control the direction and speed of said aquatic vehicle.

6. The structure of claim 5 in which said propellers are counter-rotating.

7. The structure of claim 5 in which said body portion has a viewing port for observing objects below the surface of the water.

8. A manually operated aquatic device of shallow draft comprising
(A) a bifurcated body constructed of
(1) expanded buoyant material,
(2) a relatively stiff deck on said expanded material,
(3) a U-shaped side forming member around the outside of said expanded material
(4) a waterproof covering for said expanded material, deck, and side forming member,
(B) manually operated propelling means for said body, including spaced propellers, one extending from each of the rear end portions of said bifurcated body, and a crankshaft across said rear end portions of said body and connected to drive said propellers,
(C) direction control means for said body.

9. The combination of a relatively wide aquatic device having a shallow draft and propelling means therefor, said device comprising
(A) a body having
(1) a bow portion,
(2) spaced trailing portions,
(3) said bow having a rearwardly extending depressed portion for supporting an operator,
(B) spaced propellers extending from said spaced trailing portions, and
(C) a crankshaft for operation by the feet of the person using the device
(1) said crankshaft being connected to drive said propellers.

10. The combination of a relatively wide aquatic device having a shallow draft and propelling means therefor, said device comprising
(A) a body having
(1) a bow portion,
(2) spaced trailing portions,
(3) said bow having a rearwardly extending depressed portion for supporting an operator,
(B) spaced propellers extending from said spaced trailing portions, and
(C) a crankshaft for operation by the feet of the person using the device, and
(D) a frame disposed lengthwise in each of said trailing portions and supporting said propeller shafts for angular adjustment thereof.

11. An aquatic device comprising a body having a bow and trailing portions spaced to accommodate an occupant therebetween, said bow and trailing portions providing a relatively wide and stable shallow draft device, a propeller and a rudder supported adjacent the free end of said trailing portions, a crankshaft mounted on said device and extending between said trailing portions and of a construction to be rotated by the feet of the occupant of the device and connected to drive said propellers, and means providing a connection from said rudders extending to and controllable from said bow, the rear portion of said bow being inclined and serving as a support for the user of the device and providing means by which leverage can be applied for the rotation of said crankshaft.

12. The structure of claim 11 in which said bow has a viewing device permitting the user to look downwardly beneath said bow.

13. The structure of claim 11 in which said bow is in the form of a closure with buoyant substance therein.

References Cited by the Examiner

UNITED STATES PATENTS

| 444,475 | 1/91 | Weed | 115—41 |
|---|---|---|---|
| 551,367 | 12/95 | Cremer | 115—26 |
| 577,269 | 2/97 | Powley | 115—26 |
| 738,171 | 9/03 | Dungee | 115—26 |
| 2,653,139 | 9/53 | Sterling. | |
| 3,042,945 | 7/62 | Saeman | 9—310 |

FOREIGN PATENTS 10,827 of 1892 Great Britain.
11,671 of 1933 Australia.

MILTON BUCHLER, *Primary Examiner.*
FERGUS S. MIDDLETON, RALPH D. BLAKESLEE,
*Examiners.*